US010602229B2

(12) United States Patent
Liang et al.

(10) Patent No.: US 10,602,229 B2
(45) Date of Patent: Mar. 24, 2020

(54) METHOD AND APPARATUS FOR CONTROLLING SET TOP BOX VOLUME BASED ON MOBILE DEVICE EVENTS

(71) Applicant: ARRIS Enterprises LLC, Suwanee, GA (US)

(72) Inventors: Yong Liang, Shanghai (CN); Hongbin Zhou, Shanghai (CN); Qi Wang, Shanghai (CN); Wanting Yang, Shanghai (CN); Min Wei, Shanghai (CN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/551,938

(22) PCT Filed: Dec. 30, 2016

(86) PCT No.: PCT/CN2016/113720
§ 371 (c)(1),
(2) Date: Aug. 18, 2017

(87) PCT Pub. No.: WO2018/120115
PCT Pub. Date: Jul. 5, 2018

(65) Prior Publication Data
US 2019/0313158 A1  Oct. 10, 2019

(51) Int. Cl.
*H04N 21/485* (2011.01)
*H04N 21/414* (2011.01)
(Continued)

(52) U.S. Cl.
CPC .......... *H04N 21/4852* (2013.01); *H04N 5/60* (2013.01); *H04N 21/41407* (2013.01);
(Continued)

(58) Field of Classification Search
CPC .... H04N 21/439; H04N 5/60; H04N 21/4852; H04N 21/4532; H04N 5/4403; H04N 21/41407; H04N 21/42204
(Continued)

(56) References Cited

U.S. PATENT DOCUMENTS

2009/0264072 A1* 10/2009 Dai ..................... H04L 12/2827
455/41.2
2014/0078404 A1* 3/2014 Cheung ................ H04N 5/4403
348/734

FOREIGN PATENT DOCUMENTS

CN    102761721 A    10/2012
CN    104661084 A    5/2015
CN    104867296 A    8/2015

OTHER PUBLICATIONS

PCT International Search Report & Written Opinion, RE: Application No. PCT/CN2016/113720, dated Oct. 11, 2017.

* cited by examiner

*Primary Examiner* — Paul Kim
(74) *Attorney, Agent, or Firm* — Stewart M. Wiener

(57) ABSTRACT

An apparatus, method and computer-readable medium provide control of set top box volume based on mobile device events. The apparatus may execute a process that includes controlling a volume setting of an audio amplifier to output audio content to the one or more audio or audio/visual devices. A connection event signal from a mobile device is received via a wireless radio frequency receiver. The connection event signal indicates a call state of the mobile device. In response to receiving the connection event signal, a received signal strength indication associated with the connection event signal obtained. A volume setting that corresponds to the obtained received signal strength indication is determined. The volume setting output to the audio
(Continued)

SET-TOP-BOX WITH BLUETOOTH

≈ 0m

POSITION 1: ≈ - 70 dbm

103 AT TIME TA
≈ 1m

POSITION 2: ≈ - 80 dbm

103 AT TIME TB
≈ 2m

POSITION 3: ≈ - 90 dbm

103 AT TIME TC
≈ 3m amplifier is adjusted according to the determined volume setting.

19 Claims, 5 Drawing Sheets

(51) Int. Cl.
    *H04N 21/422*     (2011.01)
    *H04N 21/439*     (2011.01)
    *H04N 21/45*     (2011.01)
    *H04N 5/60*     (2006.01)
    *H04N 5/44*     (2011.01)

(52) U.S. Cl.
    CPC ..... *H04N 21/42204* (2013.01); *H04N 21/439* (2013.01); *H04N 21/4532* (2013.01); *H04N 5/4403* (2013.01)

(58) Field of Classification Search
    USPC .......................................................... 381/107
    See application file for complete search history.

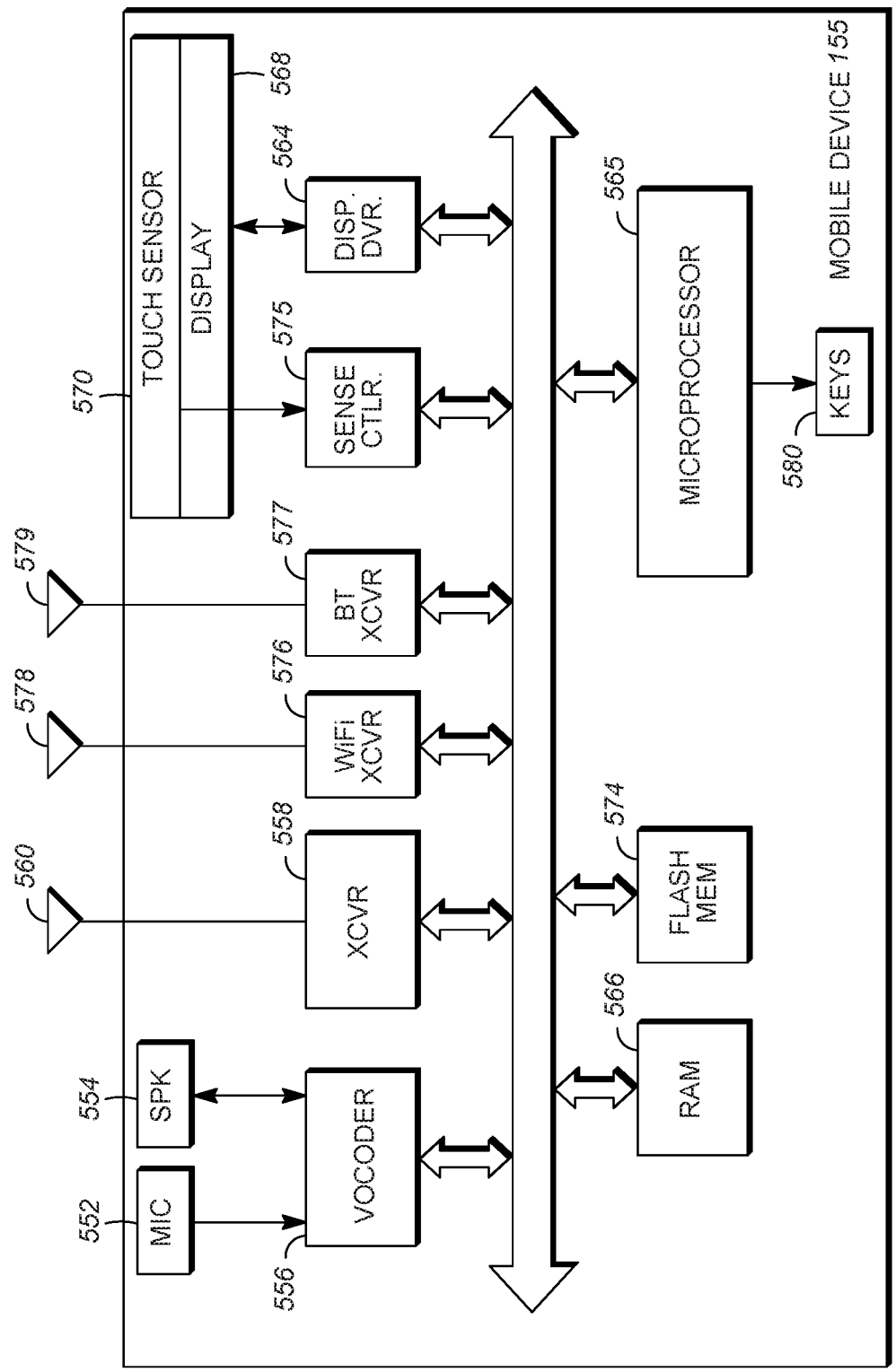

US 10,602,229 B2

METHOD AND APPARATUS FOR CONTROLLING SET TOP BOX VOLUME BASED ON MOBILE DEVICE EVENTS

TECHNICAL FIELD

The present subject matter relates to a method and apparatus for controlling the volume of a set top box based on information provided by the mobile device when engaging in a call.

BACKGROUND

Increasingly, a mobile device is a person's constant possession. As such, when a call event occurs, the person may need quiet in order to hear the calling or called party as well as to focus on the substance of the call. When a user is watching (and listening to) a television program, including movies, videos and the like, or listening to an audio system, such as an audio receiver or the like, and a call on a mobile device is either commenced or received, the audio from the television or the audio system may make it difficult for a user to hear or to concentrate on the substance of the call. In this case, the person may manually mute or decrease the volume of the TV or audio system using a remote control unit (RCU) for the audio output device, or walk away from the audio output device to clearly hear the party on the other end of the call or be understood by the other party.

Manually altering the volume or some other action via the set top box may be inconvenient as the RCU may not be immediately accessible, and having to walk away may result in the user missing a part of the television program or a part of the audio. Accordingly, there is a need to provide an improved method and apparatus for allowing a user to automatically adjust the set top box volume and thereby enable the user to have a mobile device call while in proximity of the television or audio device without having to take any direct actions to alter the volume of a television and/or audio device connected to a set top box.

SUMMARY

The concepts disclosed herein provide examples of an apparatus, a process and a machine-readable medium. The apparatus includes a wireless radio frequency receiver, an audio amplifier, a memory, and a processor. The wireless radio frequency receiver may be configured to receive wireless radio frequency signals. The audio amplifier may be configured to amplify audio content delivered to one or more audio or audio/visual devices, and to adjust the amplification in response to a received volume setting. The memory may store program instructions and information related to the volume setting. The processor may be coupled to the wireless radio frequency receiver and the memory. When the processor executes the stored program instructions, the processor is configured to control the audio amplifier according to the volume setting to output the audio content to the one or more audio or audio/visual devices. The processor receives via the wireless radio frequency receiver a connection event signal from a mobile device in communication with the apparatus. The connection event signal indicates a call state of the mobile device. The processor, in response to receiving the connection event signal, obtains a received signal strength indication associated with the connection event signal. The processor determines a volume setting that corresponds to the obtained received signal strength indication. According to the determined volume setting, the processor adjusts the volume setting output to the audio amplifier.

An example of a process is also described. The process includes controlling according to a volume setting an audio amplifier to output the audio content to the one or more audio or audio/visual devices. A connection event signal from a mobile device is received via a wireless radio frequency receiver. The connection event signal indicates a call state of the mobile device. In response to receiving the connection event signal, a received signal strength indication associated with the connection event signal obtained. A volume setting that corresponds to the obtained received signal strength indication is determined. The volume setting of the audio amplifier is adjusted according to the determined volume setting.

An example of a non-transitory machine-readable medium that contains machine-readable programming instructions is also provided. The instructions cause a processor to execute a process. The process includes controlling according to a volume setting an audio amplifier to output the audio content to the one or more audio or audio/visual devices. A connection event signal from a mobile device is received via a wireless radio frequency receiver. The connection event signal indicates a call state of the mobile device and includes an identifier associated with the mobile device. In response to receiving the connection event signal, a received signal strength indication associated with the connection event signal obtained. A volume setting that corresponds to the obtained received signal strength indication and the identifier associated with the mobile device is determined. The volume setting of the audio amplifier is adjusted according to the determined volume setting.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5 is a block diagram of an example mobile device usable in the examples illustrated in FIGS. 1 and 2.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In general, the following examples describe an apparatus and method to control the volume setting of a set top box according to events occurring on a mobile device and the distance between the mobile device and the set top box. In one implementation, both set top box and mobile have supported Bluetooth®, and there is an volume setting application running on the set top box side to monitor the mobile device events and to monitor received signal strength indicator (RSSI) of the Bluetooth signal, a mobile device volume setting application may automatically mute or adjust the volume of the set top box according to a pre-defined process. In the following examples, a set top box is equipped with Bluetooth Low Energy (BLE) transceivers that enable connection with one or more mobile devices, that are also BLE-equipped, in the vicinity of the set top box. Accordingly, the set top box and the mobile devices may pair when the user is proximate to (e.g. no more than 5-7 meters) the set top box. Once paired the set top box may receive indications of mobile events from the mobile device directly, and thereby enable the set top box to control an output volume in response to the mobile event indication as will be described in more detail with reference to the following examples. With the described examples, a user does not need to manually adjust the volume of the set top box via a remote control unit (RCU) or walk away when engaged in a call on the mobile device.

A benefit of the described examples is that there is little cost since nearly all mobile devices support Bluetooth as do the set top boxes described in the examples herein. As such, the volume setting application examples are easily implemented.

Reference now is made in detail to the examples illustrated in the accompanying drawings and discussed below.

Figure 1:
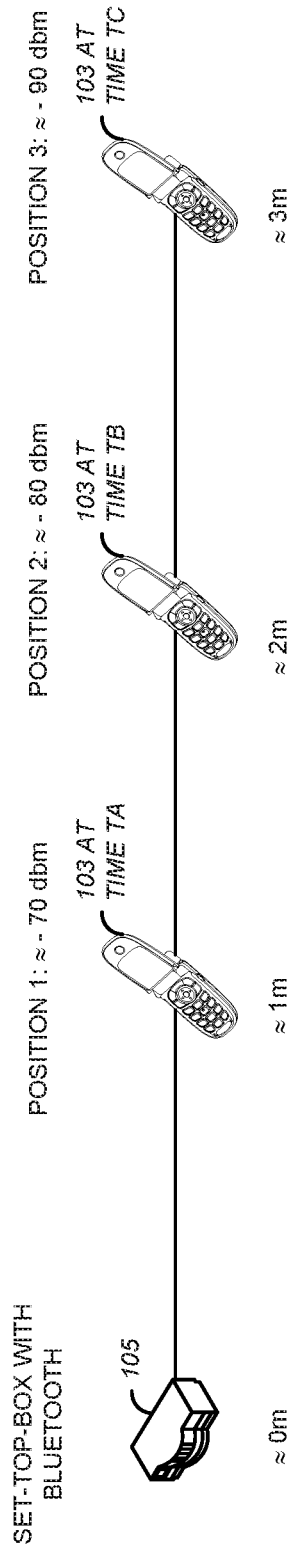
FIG. 1 is a graphic illustrating examples of received signal power measurements of signals at a set top box where the signals are transmitted from a mobile device positioned at different distances from the set-top box.

FIG. 1 is a graphic illustrating possible received signal strength indications at different distances from a set-top box equipped with a wireless transmitter or transceiver, such a Bluetooth transceiver, a near field communication (NFC) transmitter, an optical transmitter, such as an infrared (IR) transmitter/transceiver, or the like. In FIG. 1, the mobile device 103 is shown communicating with set top box 105 from different distances at different times. For example, the position at which the set-top box (STB) 105 is located is considered zero (0) meters. At a time TA, the mobile device 103 may be at Position 1, which may be approximately one (1) meter from the STB 105. From Position 1, the mobile device 103 wirelessly sends a message, such as a Bluetooth message, to the STB 105. Details of the message are described below in more detail with reference to FIG. 2. The received message may have an RSSI of approximately minus (−)70 dBm. At a time TB, the mobile device 103 may be at Position 2, which may be approximately two (2) meters from the STB 105. From Position 2, the mobile device 103 wirelessly sends a message, such as a Bluetooth message, to the STB 105. The received message may have an RSSI of approximately minus (−)80 dBm. At a time TC, the mobile device 103 may be at Position 3, which may be approximately three (3) meters from the STB 105. From Position 3, the mobile device 103 wirelessly sends a message, such as a Bluetooth message, to the STB 105. The received message may have an RSSI of approximately minus (−)90 dBm. The received signal power may, for example, be converted or translated to a received signal strength indicator (RSSI) by the STB 105.

The messaging between the mobile device 103 and the STB 105 may be used for a variety of purposes. An example of such a purpose is described with reference to FIG. 2.

Figure 2:
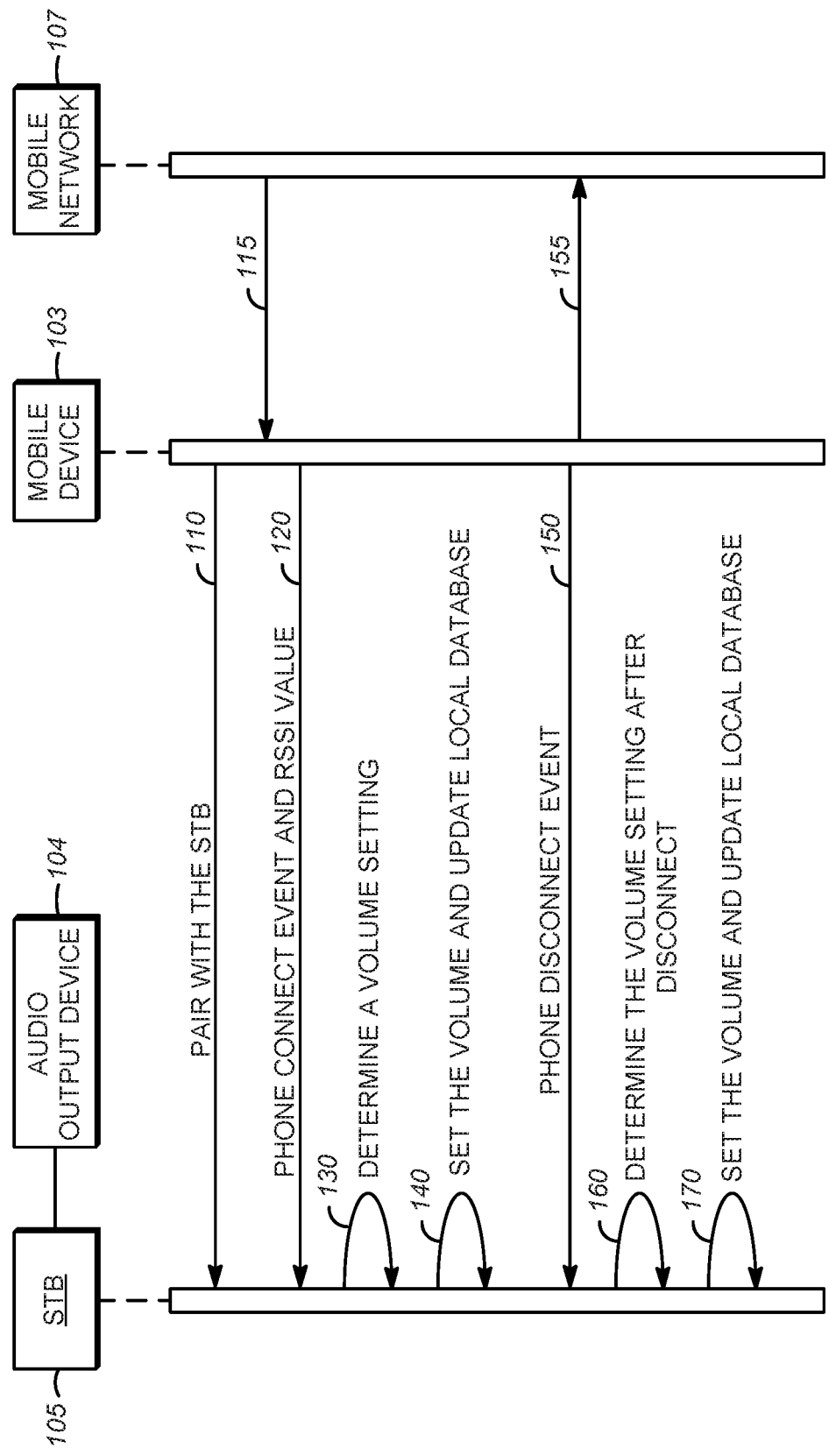
FIG. 2 is a flowchart of an example process for communicating between a set top box and a mobile device that are similarly equipped for wireless communication, such as that shown in FIG. 1.

FIG. 2 is a high level pong-pong chart of an example process for controlling a STB volume setting. In the example, the STB 105 and mobile device 103 are within communication distance of one another. For example, the STB 105, the audio output device 104 and the mobile device 103 may be within the same room of a premises. The mobile device 103 may be configured to communicate with mobile network 107, which may be a cellular communication network.

The audio output device 104 may be an audio/video receiver, an audio receiver, a gaming system, a television, or a wired or wireless speaker, or the like. Examples of the STB 105 and mobile device 103 will be described in more detail with reference to FIGS. 3 and 4 respectively. The STB 105 is configured to control an audio amplifier (not shown in FIG. 2) to output from the STB 105 audio content to the one or more audio or audio/visual devices 104. The set top box 105 controls an audio amplifier according to a volume setting. The volume setting may be, for example, a volume setting value, an input value to a volume setting algorithm, or a value stored in a register location in a memory or to a register within the audio amplifier (not shown in this example).

In one example, using a Bluetooth personal area network (PAN), an application running on the mobile device 103 automatically pairs with the STB 105 at 110. For example, both the mobile device 103 and the STB 105 may have Bluetooth transceivers, and the devices 103, 105 may pair with one another according to the Bluetooth protocol. The pairing process may include the exchange of identifying information, such as a mobile device identifier (e.g., mobile device number (MDN) or International Mobile Equipment Identity (IMEI) or the like) and STB identifier (e.g., a STB name provided by a user). The exchanged identifying information may be accessible by applications operating on the respective devices. For example, an volume setting application executing on the STB 105 may be able to access the identifying information, such as a mobile device identifier, provided by the mobile device 103. Similarly, an volume setting application executing on the mobile device 103 may be able to access the identifying information, such as a STB identifier, provided by the STB 105.

The mobile device 103 has a call state setting. The call state setting of the mobile device 103 may be Off-Call (disconnect), On-Call (connect) or the like. The mobile device 103 in response to a change in call state may generate a signal referred to herein as a connection event signal (when connecting for a call, e.g., On-Call) or a disconnect event (when terminating a call, e.g., Off-Call). The connection/disconnect event signal indicates a call state (e.g., On-Call or Off-Call) of the mobile device 103. The mobile device 103 also has an application program interface (API) that allows applications running on the mobile device to access the call state value.

For example, the mobile device 103 in response to a user input may initiate a call that upon connection to another handset (wireless, landline or voice-over-IP), to a voicemail system, or another mobile device, is considered a change of call state to an active call. Alternatively, the mobile device 103 may accept a call thereby connecting the mobile device 103 to another device for purposes of having a call. The accepted call is also considered an active call. The application running on the mobile device 103 senses the change in call state through the API and generates a connection event signal that is transmitted wirelessly to the STB 105 via the Bluetooth PAN.

In a more detailed example, the mobile device 103 may have a processor (not shown in this example) that operates with either an IOS or an Android operating system. Similarly, the STB 105 includes a processor (not shown in this example). The STB 105 and the mobile device 103 may include a volume setting application and the mobile device may include a call monitoring application that, using the API on the mobile device, may monitor the call state status of the mobile device 103 for specific change events, such as dialing, connecting and disconnecting with another party. In response to specific status change events, for example, a connecting event or a disconnecting event, the mobile device 103 volume setting application may cause the transmission of a call state message with the specific message format to the STB 105, and the STB volume setting application executing on the STB 105 may take actions based on the call state message received from the mobile device 103. For example, since the mobile device 103 is paired with the STB 105 via Bluetooth, the devices 103 and 105 may communicate using Bluetooth Message Access Profile (MAP).

At 115, the mobile device receives a call from the mobile network 107. The mobile device then sends a connection event signal to the STB 105 in communication with (or paired with) the set mobile device 103 (at 120). The STB 105 may interpret the received connection event signal as an indication that the mobile device 103 call state is an active call. The STB 105 in response to receiving the connection event signal, may measure an RSSI associated with the connection event signal sent by the mobile device 103. For example, the set top box 105 may have circuitry, for example, in the wireless receiver, for determining an RSSI based on a received signal power of the connection event signal.

The volume setting application running in the STB 105 may obtain the RSSI and take appropriate actions according to the received call state. Upon receiving the signaling event, the application running on the STB 105 may send a signal to the audio amplifier to mute the audio output or, using the obtained RSSI, the STB 105 may determine a volume setting that corresponds to the obtained RSSI (at 130). A volume setting may be a volume setting value that is input to a volume setting function, or stored using a pointer value into a register location in the STB 105 memory or into a register within an audio amplifier of the STB 105.

In another example, the volume setting application running in the STB 105 may locate a preferred volume setting associated with the mobile device identifier in a set of a volume settings stored in the STB 105 memory. Based on the preferred volume setting associated with the identifier and the received signal strength indication, the STB 105 may output a volume setting value to the audio amplifier (not shown in this example) of the STB 105.

The STB 105, at 140, adjusts the volume setting value for an audio amplifier internal to the STB 105 according to the determined volume setting to control the audio output from the audio output device 104. For example, while the mobile device 103 is in an active call state status, the volume of the audio output device 104 may be reduced to allow the user of the mobile device 103 to hear the party that called or was called by the mobile device 103. For example, when the call state is connected (i.e. active), the volume setting application executing on the processor of the STB 105 outputs a volume setting that controls the volume output by decreasing the volume setting of the audio output device 104 to a pre-defined value. For example, the STB 105 may output a volume setting that decreases the audio volume from a prior or normal volume output of 40 out of 100 (100 equals maximum volume and 0 equals minimum volume) to 20 out of 100.

The format of the data stored in a memory or register may take various forms. For example, the mobile device 103 volume setting application may store the updated value into memory for future use in the following format: (70, 18, 1) or (70, 0, 1), where the first data field is the RSSI (e.g., 70 corresponding to −70 dBm), the second field is the volume setting (18 or 0), and the third field is the connection state (0 or 1). The RSSI in the first field may be determined by a manufacturer of the STB, for example, some manufacturer's use a range of 0-100, while others use 0-60. The volume setting in the second field, for example, may go from lowest (0—mute or no output volume) to highest (100—maximum). The third field may simply be a 0 indicated disconnected state and a 1 indicates a connected state. In other examples, the volume setting application may be configured to set different volume values for the internal audio amplifier according to the RSSI, e.g.: (80, 25, 1) of the signal received from the mobile device via the PAN. If the state become disconnected, the app will restore the volume according to database automatically, e.g.: (−70 dBm, 35, 0) or (−80 dBm, 40, 0). Of course, other formats may be used and the foregoing was provided for illustrative purposes.

In another example, since the mobile device 103 has been paired with the STB 105 in advance, the respective device 103 and STB 105 identifiers are known to each other, and the STB 105 may record the current RSSI and the volume settings as being a "normal state" into local database as reference, e.g.: (−70 dBm (or 70), 35, 0). In later examples, the stored "normal state" may be updated by mobile device 103 or STB 105 in response to inputs to a user interface.

In yet another example, the volume setting application executing on the mobile device 103, STB 105 or both may be enabled to revise or update the volume setting in the case that a user is not satisfied with the default value. In such a case, the volume setting application executing on the mobile device 103 may enable the mobile device 103 to specify and communicate an alternate volume setting, for example, in response to an input to a volume setting application user interface. For example, in response to selection of one of the optional volume settings, the selected optional volume setting may be stored in the memory of the STB 105 as a user preference.

Alternatively, a user interface presented by the mobile device 103 volume setting application may provide a menu of settings that enable a user to choose preferences different from reducing the volume. For example, when pairing for the first time, such as at 110, the mobile device 103 volume setting application may present a volume settings menu that offers a number of different configuration settings for the volume setting application. In response to receiving a selection from a user input associated with the presented volume settings menu, a menu of optional volume settings may be presenting for responding to the connection event signal. As an alternative to decreasing the volume setting, the user may select a user preference presented in the menu for the STB 105 to pause the video and audio (e.g., by buffering the video and audio in memory), to mute the audio but continuing to play the video, or to perform no action as the user expects to walk away from the area.

Although the user interface is described as using a menu, it is contemplated that other user interfaces may be employed, for example a user interface that allows the user to enter specific values for the RSSI and corresponding volume settings.

In some examples, the STB 105 continues to receive signals from the mobile device 103 that enables the STB 105 to obtain updated RSSIs. The volume setting application executing on the STB 105 may, in response to the updated RSSIs, transmit volume settings that increase the volume of the audio output device as the RSSI's decrease, indicating that the connected device has moved further away from the STB 105.

Returning to the example of FIG. 2 at 150, the mobile device 103 may transmit a disconnect event signal to the STB 105 and, at 155, send a disconnect signal to the mobile network 107 to terminate the call that was started at 115. The disconnection event signal indicates that the mobile device 103 is no longer on an active call. Alternatively, instead of waiting for the disconnect event, the STB 105 may, for example, after expiration of a predetermined time period after receipt of the connection event signal, change the determined volume setting to a volume setting equal to a volume setting prior to receipt of the connection event signal. This may be desirable for instances where the user walks away from the STB 105 so that the STB 105 is unable to receive the disconnection event signal.

At 160, in response to a disconnection event signal, the STB 105 may change the selected volume setting to the volume setting prior to receipt of the connection event signal at 120. For example, if the volume setting prior to receipt of the connection event at 120 was 77 and after receipt of the connection event was set at 140 to 27, the STB 105 may, at 160, upon receipt of the disconnect event signal at 150, determine that the volume setting may revert to 77. In which case, at 170, the reverted or prior volume setting (i.e., 77) is provided to adjust the output of the audio output device 104.

In other examples, the STB 105 may respond at 160 by taking other actions to determine the volume setting after receipt of the disconnect event. For example, a volume setting application executing on the mobile device 103 may have changed the volume setting during the call (i.e., in the time between 120 and 150). For example, in response to reception of an input to the user interface requesting a volume settings menu, the mobile device 103 may obtain an identifier from the connection event signal. The user may also change the volume setting on the STB 105 using the remote control device of the STB (not shown in FIG. 2) and, in response, the STB 105 may send a signal (not shown) indicating the change in volume setting through the PAN to the mobile device 103.

The volume setting application executing on the STB 105 may at 160 access a memory associated with an identifier of the mobile device 103 to retrieve user preference information. The STB 105 may obtain a volume setting from the user preference information that is personalized for the respective user. As such, different mobile devices may have different volume settings based on user preferences. For example, an elderly person may have a preferred volume setting that mutes the audio output, while a younger person may have a preferred volume setting that reduces the audio output to a lower volume.

The user preference information may be modified for example, by a user via a volume settings menu. A volume setting application executed by either the STB 105 processor or a mobile device processor 105, may, in response to reception of an input to the user interface requesting a volume settings menu, present a menu of optional volume settings for responding to a subsequent connection event signal from the mobile device.

For example, a user interface menu may be presented on a display of the mobile device 103 by the application executing on the mobile device 103 or a user interface menu may be presented on a display of the STB 105 by the application executing on of the STB 105. The respective application may receive an input indicating an updated volume setting as a selection from the menu an optional volume setting. The updated volume setting may indicate a volume setting that is lower than a volume setting determined at 130. In response, at 170 the application may update user preferences associated with the mobile device 103 stored in the memory based on the selected optional, updated volume setting. The selected optional, updated volume setting may be stored in the memory as a preferred volume setting that is associated with the mobile device. In addition at 170, the updated volume setting may be used to adjust the volume setting of the audio signals sent to the audio amplifier.

After configuring the updated settings, upon receipt of a subsequent connection event signal from the mobile device 103, the STB 105 may retrieve the preferred volume setting from the memory, and output the preferred volume setting to the audio amplifier.

In some instances, the volume setting application executing on the STB 105 allows the STB 105 to pair with a number of different mobile devices, including mobile device 103. The number of different mobile devices may have conflicting user preference settings. In order to address the possible conflicts, the application on the STB 105 may have a conflict priority setting. A conflict priority setting may be a setting that is used to resolve volume setting conflicts when multiple mobile devices provide connection event signals to the STB 105. The conflict priority assigned to a mobile device may be based on a user's position in the family or business hierarchy, the age of the user, degree of hearing impairment, which mobile device was first to send the connection event signal or the like.

An example of a set top box configured for communicating with a mobile device 103 such as that described with reference to the above examples is now described in more detail with reference to FIGS. 3 and 4.

Figure 3:
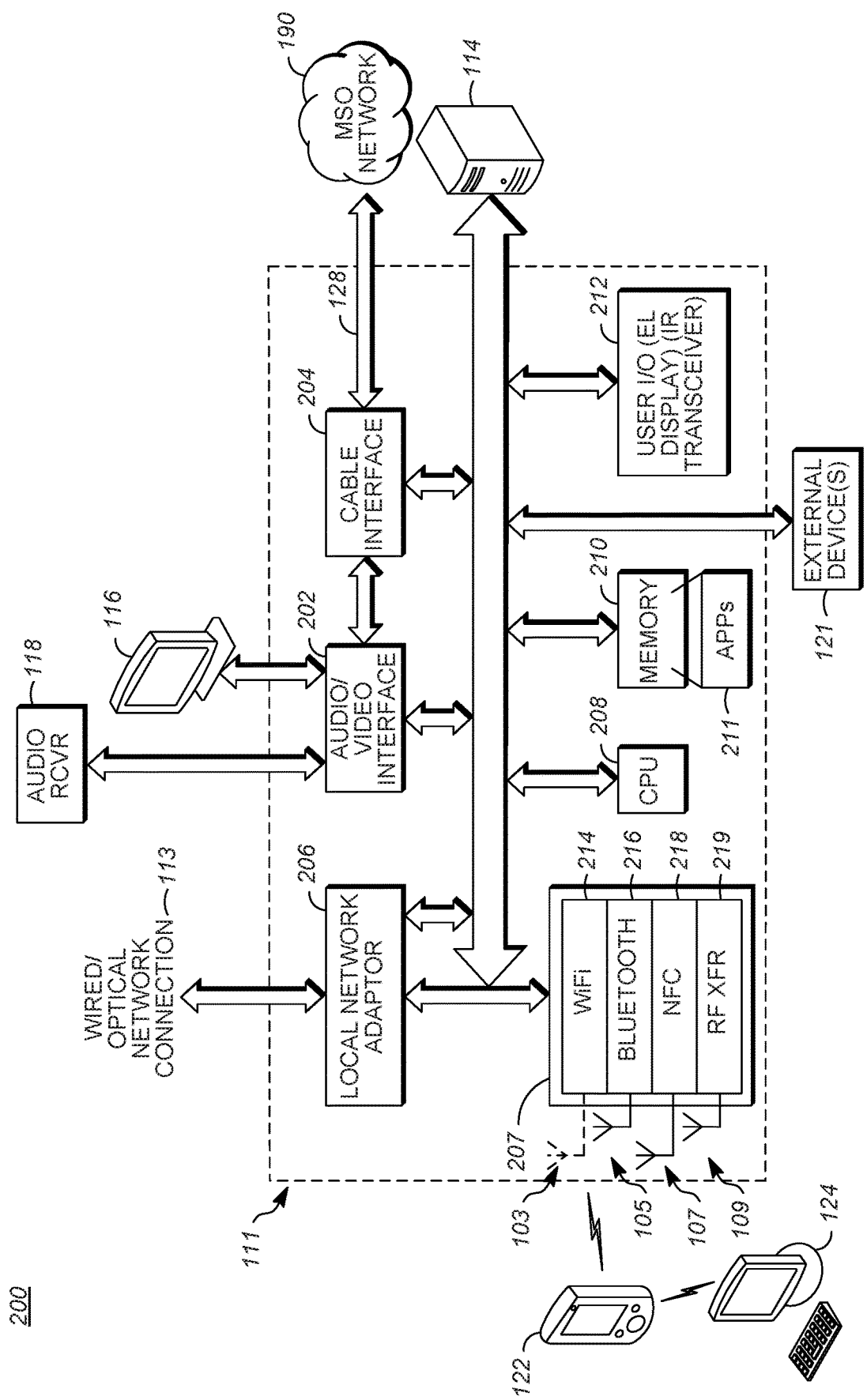
FIG. 3 is a block diagram of an example set top box useful for controlling devices and for coupling to devices proximate to the set top box.

FIG. 3 shows a block diagram of an example set-top box (STB) 111. The example STB 111, similar to that shown in FIGS. 1 and 2, includes an audio video interface 202 for processing data, e.g. decoding an MPEG or HEVC video stream to output visual content for display on display device 116 and to stream audio content to display device 116 and/or audio receiver 118. The STB 111 also includes an interface for local communication with consumer premises equipment (CPE) devices, and in this example, that interface takes the form of a local network adapter 206 which includes a wired/optical communication port as well as wireless ports to WiFi transceiver 214, Bluetooth transceiver 216, NFC transceiver 218 and an RF transceiver (labeled "RF XFR), such as a ZigBee RF4CE transceiver. In this example, WiFi transceiver 214 may be a WiFi access point.

The STB 111 also includes cable interface 204 for receiving programming and Internet protocol (IP) packets from an edge serving office (ESO) (not shown). An ESO may be a headend or central office of a multiple service provider (MSO) 190, such as a cable, satellite, or telephone company. The IP packets may, for example, include HEVC streams, encapsulated MPEG transport streams, Windows Media streams or other audio/video streaming data. The video data received and processed by the STB 111 is collectively referred to herein as video streams. These streams may include MPEG transport streams from the cable interface 204, IP encapsulated MPEG or HEVC transport streams from the MSO 190 ESO, HEVC video streams, Windows Media video streams or other streaming video data. The circuitry of the audio video interface 202 may include circuitry that decodes selected video streams to send decoded video data to the display device 116. An example of an audio video interface 202 is described below with reference to FIG. 2.

The MSO network 190 may be coupled to a cable input line 128 of the STB 111. In instances where the MSO 190 delivers a number of channels of content, such as sports channels, cooking show channels, history-related channels, premium movie channels, public service channels, traditional television network channels and the like, a viewer/user may select to view the different channels via the first source I/O terminal 212 of the STB 111. The cable interface 204 may also send and receive data over the MSO network 190 to/from an ESO-associated server (not shown) and/or a content server (not shown) to obtain media content and possibly meta-data files or meta-data related instructions from the ESO server. In addition to the MSO network 190 sources of content, other sources of content include external devices 121, sources connected via a wired/optical connection 113, computer 124 or the like of as other sources of content available through the cable input line 128. For example, the audio/video content may be provided to the audio/video sources 243 and 245 of FIG. 4 by audio and video content providers such as cable television companies, internet video and audio services, such as Netflix™, Roku™, Hulu™, CBS All Access™, Amazon™ and the like, streaming audio services, such as Pandora™, iHeart™ radio and the like, gaming sources, such a Xbox™, PlayStation™, Wii™; internet sources, as well as DVD players, CD players, cameras, computers, audio/video portable devices (e.g., iPods™ and smartphones), and similar devices and services.

The STB 111 also includes circuits forming one or more processors to implement a CPU 208 and memory 210 for controlling operations of the STB 111, including executing programming instructions for performing the processing for the volume setting application as well as programming related to user interface functions, such as those described with reference to FIG. 2. The example STB 111 is connected to the network attached storage (NAS) device 114 for storing data, such as, for example, volume setting application user preference information, information related to volume setting, such as a set of volume settings, media content and meta-data files downloaded via the MSO network 190, and the like. The memory 210 may include one or more memories and/or other program and data storage devices, for example, for storing instructions executable by the CPU 208. The memory 210 may also include program instructions, such as applications (Apps) 211, user preference information, associated mobile device information, and the like related to the volume setting application described above with reference to FIG. 2. The volume setting application may be stored in as one of the Apps 211.

The example STB 111 also includes a user I/O interface 212. The user I/O interface 212 may include an electroluminescent (EL), liquid crystal device (LCD), or light emitting diode (LED) display for displaying information to the user watching the display device 116. The user I/O interface 212 may also include an infrared (IR) receiver for receiving instructions from a user's remote control (not shown). Although not shown in detail, this IR receiver may be implemented as an IR transceiver and provide a communication channel for sending and receiving short-range optical communications between the STB 111 and one or more of the CPE devices 114, 116, 118, 121, 122, and 124.

The audio video interface 202 may implemented in many different interface configurations. An example audio video interface is described in more detail with reference to FIG. 4. Note that the example of FIG. 4 is but one example of the many different interface configurations and implementations of an audio video interface.

Figure 4:
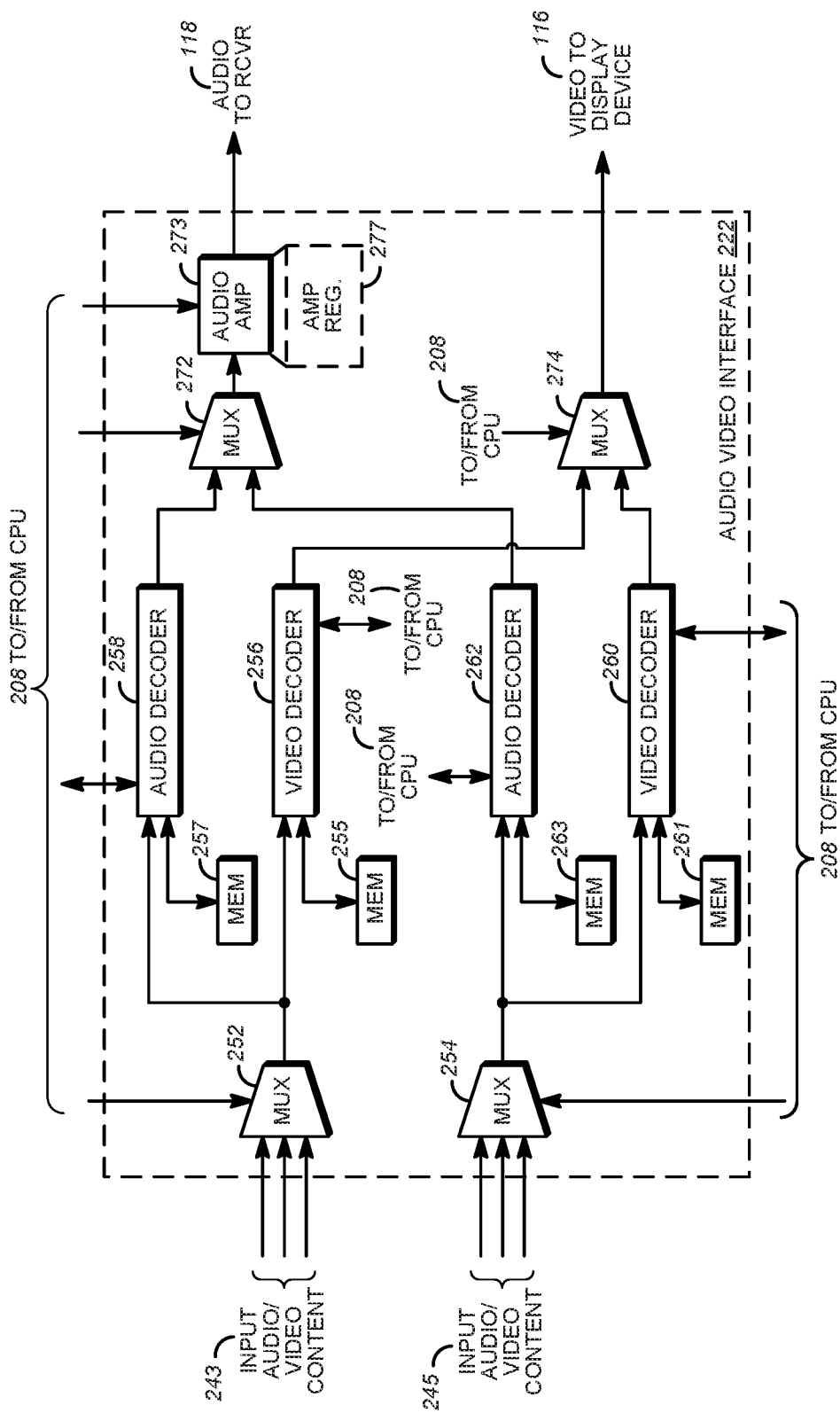
FIG. 4 is a block diagram useful for describing an example of an audio video interface component device, useful in a set top box, such as that shown in FIG. 3.

In the example of FIG. 4, the audio video interface 222 includes various components such as multiplexors (MUX) 252, 254, 272 and 274, memory (MEM) storage 255, 257, 261 and 263, video decoders 256, 260 audio decoders 258 and 262, and an audio amplifier 273. The example audio video interface 222 includes inputs from audio/video content sources 243 and 245 and outputs from the audio amplifier 273 and the video multiplexor 274. In addition, the CPU 208 may provide control signals to and may receive signals from components of the audio video interface 222. For example, the multiplexors 252, 254, 272 and 274, the video decoders 256, 260, the audio decoders 258 and 262, and the audio amplifier 273 may each receive control signals from the CPU 208. In addition, the video decoders 256, 260 and the audio decoders 258 and 262 may provide data, such as setting or status information, to the CPU 208.

As shown in FIG. 4, audio/video content 243 or 245 is input into the audio video interface 222. Only two audio/video content inputs to the interface 212 are shown for ease of explanation but it is envisioned that the example configuration may scale to accommodate a greater number of inputs. The input audio/video content 243 and 245 is provided from different audio/video content sources as discussed above with reference to FIG. 2. For ease of discussion, only the processing and switching of input audio/video content 243 is described below. However, it should be apparent to one of skill in the art that the described processing and switching of input audio/video content 243 is applicable to the input audio/video content 245 or any other content inputs to the audio interface 222.

The inputted audio/video content 243 is received by the audio video interface 222 at multiplexor 252. The inputted audio/video 243 may include input from a number of different audio/video sources (not shown in this example, but such as those described with reference to MSO network 190) or may channelized audio/video from a single source, such as a cable television provider. The multiplexor 252 includes a number of inputs for receiving the audio/video content 243 and a control input (shown by the arrow) for selection of particular audio/video content for output from the multiplexor 252. The control input to the multiplexor 252 may be provided, as shown, by the CPU 208.

In response to the control input, the multiplexor 252 passes the selected audio/video content to the audio decoder 258 and the video decoder 256. For example, the audio decoder 258 may receive control signals from the CPU 208 and provide decoding status and/or other information to the CPU 208 (as shown by the double headed arrow). Similarly, the video decoder 256 may receive control signals from the CPU 208 and provide decoding status and/or other information to the CPU 208 (as shown by the double headed arrow). The audio signals of the selected audio/video content are decoded by the audio decoder 258, and video signals of the selected audio/video content are decoded by the video decoder 256, respectively. The respective memories 257 and 255 may be used to buffer received or decoded audio and video, and to hold reference data used by the audio decoder 258 and video decoder 256, respectively. In addition, if there were more than one output device, the memories 257 and 255 may store decoder setting values that are used to decode the respective audio or video content depending upon the output device. For example, a television or a wireless entertainment system may require decoded audio in different formats, and, as such, may require different decoding schemes.

The decoded audio is output to multiplexor 272. The example multiplexor 272 has inputs from a number audio decoders, such as 258 and 262. Similar to choosing which particular audio/video content to forward, the CPU 208 also provides a control signal selecting the decoded audio output from the respective audio decoders 258 and 262 to be forwarded to the audio amplifier 273. The control signal is asserted to the multiplexor 272, and based on the control signal outputs decoded audio from audio decoder 258 to the audio amplifier 273.

Similarly, the decoded video is output to multiplexor 274. The multiplexor 274 has inputs from a number video decoders, such as 256 and 260. Similar to choosing which particular audio/video content to forward, the CPU 208 also provides a control signal selecting the decoded video from the respective video decoders 256 and 260 to be forwarded to the display device 116. The control signal asserted to multiplexor 274 indicates which decoded video is to be forwarded to the display device 116.

The audio amplifier 273 amplifies the decoded audio output from the multiplexor 272 prior to delivery to the audio inputs of the display device and/or to the audio receiver 118. The level of amplification provided by the audio amplifier 273 is based on the volume setting provided by the volume setting application executing by the CPU 208. As discussed above, the volume setting is provided to the audio amplifier 273. Based on the volume setting, the audio amplifier 273 may amplify the decoded audio for output to the receiver 118. For example, a volume setting corresponding to 0 (i.e., mute or minimum volume setting) may result in a gain of 0 being applied to the audio data so that the receiver outputs no audible sound or, at the loudest, a very faint audible sound, such as 10-20 decibels. Conversely, a volume setting corresponding to 50 may correspond to a typical radio or television program, such as 60-70 decibels.

Optionally or alternatively, the audio amplifier 273 may include an amplifier register 277 that stores amplification values that correspond to the volume settings provided by the CPU 208. For example, the volume setting provided by the CPU 208 to the audio amplifier 273 may be a loadable register 277 or a pointer to a particular register location in a memory (not shown) that may be written into by the CPU 208 and read by the audio amplifier 273. The amplifier 273 may have firmware or circuitry that enables the retrieval of the amplification setting stored in the register 277 in response to receiving the volume setting from the CPU 208. Upon retrieval of the amplification setting, the amplifier 273 amplifies the output audio signal according to the amplification setting.

As described above, a mobile device, such as mobile device 103, provides information to the STB 105 either in the form of call state signals, mobile device information when pairing, or updated volume settings via operation of aspects of the above described volume setting application. FIG. 5 is a block diagram of an example mobile device 155 that may be used as the mobile device 103, shown in FIGS. 1 and 2 or the mobile device 122 shown in FIG. 3. The mobile device includes a touch-screen display 568 for displaying application screens, messages, menus or the like and for receiving input selections such as volume settings, dialed numbers and web page navigation. A keypad 580 includes a limited number of keys that perform functions such as power-on/off, sound volume adjustments and other functions of the device.

A microprocessor 565 serves as a programmable controller for the mobile device 155 in that it controls all operations of the mobile device 155 according to programming that it executes. In the example, the mobile device 155 includes flash type program memory 574 for storage of various "software" or "firmware" such as an operating system and application programs, including the volume setting application as described above. In addition, the memory 574 may hold mobile configuration settings, such as mobile directory number (MDN) and/or mobile identification number (MIN), and the like. The MIN or MDN may be used as mobile device identifiers that are provided to the STB 103 during pairing. The mobile device 155 may also include a non-volatile random access memory (RAM) 566 as working data processing memory.

The mobile device 155 further includes a microphone device 552, speaker 554 and vocoder 556 for audio input and output functions. The mobile station 155 also includes at least one digital transceiver (XCVR) 558, for digital wireless communications, such as cellular communications, and one or more short-range, wireless radio frequency transceivers 576 and 577, shown in the example as a Wi-Fi transceiver 576 and a Bluetooth (BT) or BLE transceiver 577, respectively, to communicate with the STB 111 via a Wi-Fi channel and/or a Bluetooth channel. The transceiver 558 provides two-way wireless communication of information, such as vocoded speech samples and/or digital information, in accordance with the technology of a telecommunications network, such as a cellular network. Each example transceiver 558, 576 and 577 connects through RF to send and receive amplifiers (not separately shown) and to a respective antennas 560, 578 and 579. The transceiver 558 may also support various types of mobile messaging services, such as short message service (SMS), enhanced messaging service (EMS) and/or multimedia messaging service (MMS) and may include a web browser for interacting with websites either through the telecommunications transceiver 558 or the wireless transceiver 576. The BT transceiver 577 may interact with other Bluetooth-equipped devices, such as a wireless headset (not shown) or the like.

The user interface of the exemplary mobile device 155 includes a display 568, which the microprocessor 562 controls via a display driver 564, to present visible outputs to the device user, such as an optional volume setting menu. The user interface also includes a touch/position sensor 570 that overlays the display 568 and is relatively transparent, so that the user may view the information presented on the display 568. A sense controller 572 senses signals from elements of the touch/position sensor 570 and detects occurrence and position of each touch of the screen formed by the display 568 and sensor 570. The sense controller 572 provides touch position information to the microprocessor 562, which can correlate that information to the information currently displayed via the display 568, to determine the nature of user input via the sensor 570.

Aspects of the methods of the exemplary apparatus and method outlined above may be embodied in programming, e.g. in the form of software, firmware, or microcode executable by a user computer system, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software, such as volume setting application from one computer or processor into another, for example, from a management server or host processor into the memory 210 of the set top box 111, or even the memory 566 and/or 574 of the mobile device 155. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical or similar elements in the process, method, article, or apparatus that comprises the element.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Each of the various couplings may be considered a separate communications channel.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An apparatus, comprising:
a wireless radio frequency receiver configured to receive wireless radio frequency signals;
an audio amplifier configured to amplify audio content delivered to one or more audio or audio/visual devices, and configured to, in response to a received volume setting, adjust the amplification;
a memory for storing program instructions and information related to the volume setting;
a processor coupled to the wireless radio frequency receiver and the memory, wherein, when executing the stored program instructions, the processor is configured to:
control according to the volume setting the audio amplifier to output the audio content to the one or more audio or audio/visual devices;
receive via the wireless radio frequency receiver a connection event signal from a mobile device in communication with the apparatus, wherein the connection event signal indicates a call state of the mobile device;
in response to receiving the connection event signal, obtain a received signal strength indication associated with the connection event signal;
determine a volume setting that corresponds to the obtained received signal strength indication; and
adjust the volume setting output to the audio amplifier according to the determined volume setting; and
a user interface configured to receive user inputs;
wherein, when executing the stored program instructions, the processor is further configured to:
in response to reception of an input to the user interface requesting a volume settings menu, present a menu of optional volume settings for responding to a subsequent connection event signal from the mobile device;
in response to selection of one of the optional volume settings, store the selected optional volume setting in the memory as a preferred volume setting that is associated with the mobile device;
upon receipt of the subsequent connection event signal from the mobile device, retrieve the preferred volume setting from the memory; and
output the preferred volume setting to the audio amplifier.

2. The apparatus of claim 1, wherein the connection event signal indicates the call state of the mobile device as an active call, wherein an active call is a call that is initiated or accepted at the mobile device.

3. The apparatus of claim 1, wherein in the memory further stores volume setting preference information that is associated with the mobile device in communication with the apparatus.

4. The apparatus of claim 3, wherein the volume setting preference information includes a plurality of volume settings, the plurality of volume settings including one or more of a series of default volume settings based on the received signal strength indication, a time period for maintaining the selected volume setting, a pause content output setting, a conflict priority setting, or a mute setting.

5. The apparatus of claim 1, wherein:
the information related to the volume setting includes a preferred volume setting associated with an identifier of one or more mobile devices, including the mobile device;
the connection event signal further includes a mobile device identifier associated with the mobile device;
the audio amplifier includes a register storing an output amplification value of the audio content when delivered to the one or more audio or audio/visual devices; and
the processor is further configured to:
obtain the mobile device identifier from the connection event signal;
locate the preferred volume setting associated with the mobile device identifier in the information related to the volume setting stored in the memory; and
store the volume setting in the register of the audio amplifier.

6. The apparatus of claim 1, wherein the processor is further configured to:
receive an input value via a user interface indicating an updated volume setting, wherein the updated volume setting indicates a volume setting that is lower than the selected volume setting; and
change the volume setting of the amplifier to the updated volume setting.

7. The apparatus of claim 6, wherein the processor is further configured to:
update user preferences associated with the mobile device stored in the memory to change the volume setting stored in the memory to the updated volume setting.

8. The apparatus of claim 1, wherein the processor is further configured to:
after expiration of a predetermined time period after receipt of the connection event signal, change the selected volume setting to a volume setting equal to a volume setting prior to receipt of the connection event signal.

9. The apparatus of claim 1, wherein the processor is further configured to:
in response to a disconnection event signal, change the selected volume setting to a volume setting equal to a volume setting prior to receipt of the connection event signal.

10. A method, comprising:
controlling according to a volume setting an audio amplifier to output audio content to one or more audio or audio/visual devices;
receiving via a wireless radio frequency receiver a connection event signal from a mobile device, wherein the connection event signal indicates a call state of the mobile device;
in response to receiving the connection event signal, obtaining a received signal strength indication associated with the connection event signal;
determining a volume setting that corresponds to the obtained received signal strength indication; and
adjusting the volume setting of the audio amplifier according to the determined volume setting; and
in response to reception of an input to a user interface requesting a volume settings menu, presenting a menu of optional volume settings for responding to a subsequent connection event signal from the mobile device;
in response to selection of one of the optional volume settings, storing the selected optional volume setting in the memory as a preferred volume setting that is associated with the mobile device;
upon receipt of the subsequent connection event signal from the mobile device, retrieving the preferred volume setting from the memory; and
outputting the preferred volume setting to the audio amplifier.

11. The method of claim 10, further comprising:
interpreting the received connection event signal as an indication that the mobile device call state is an active call, wherein an active call is a call that is initiated or accepted by the mobile device.

12. The method of claim 10, further comprising:
in response to receiving a selection from a volume settings menu, presenting a menu of optional volume settings for responding to the connection event signal;
in response to selection of one of the optional volume settings, storing the selected optional volume setting in the memory as a user preference; and
using the selected optional volume setting as the determined volume setting for adjusting the volume setting of the amplifier.

13. The method of claim 10, wherein:
the connection event signal further includes a mobile device identifier associated with the mobile device; and
the method further comprises:
obtaining a mobile device identifier from the connection event signal;
locating a preferred volume setting associated with the mobile device identifier in a set of volume settings stored in the memory; and
outputting one of the stored volume setting to the audio amplifier based on the preferred volume setting associated with the mobile device identifier and the received signal strength indication.

14. The method of claim 11, further comprising:
receiving an input indicating an updated volume setting, wherein the updated volume setting indicates a volume setting that is lower than the determined volume setting; and
changing the volume setting of the amplifier to the updated volume setting.

15. The method of claim 11, further comprising:
updating user preferences associated with the mobile device stored in the memory based on the updated volume setting.

16. The method of claim 11, further comprising:
after expiration of a predetermined time period after receipt of the connection event signal, changing the selected volume setting to a volume setting equal to a volume setting prior to receipt of the connection event signal.

17. A non-transitory machine-readable medium containing machine-readable programming instructions, the instructions causing a processor to:
control, according to a volume setting, an audio amplifier to output audio content to one or more audio or audio/visual devices;
receive a connection event signal from a mobile device, wherein the connection event signal indicates a call state of the mobile device and includes an identifier associated with the mobile device;
in response to receiving the connection event signal, obtain a received signal strength indication associated with the connection event signal;
determine a volume setting that corresponds to the obtained received signal strength indication and the identifier associated with the mobile device; and
adjust the volume setting of the audio amplifier according to the determined volume setting; and
in response to reception of an input to a user interface requesting a volume settings menu, present a menu of optional volume settings for responding to a subsequent connection event signal from the mobile device;
in response to selection of one of the optional volume settings, store the selected optional volume setting in the memory as a preferred volume setting that is associated with the mobile device;
upon receipt of the subsequent connection event signal from the mobile device, retrieve the preferred volume setting from the memory; and
output the preferred volume setting to the audio amplifier.

18. The non-transitory machine-readable medium of claim 17, the instructions further causing the processor to:
receive an input indicating an updated volume setting, wherein the updated volume setting indicates a volume setting that is lower than the adjusted volume setting; and
change the volume setting of the amplifier to the updated volume setting.

19. The non-transitory machine-readable medium of claim 18, the instructions further causing the processor to:
update user preferences associated with the mobile device stored in the memory based on the updated volume setting.

* * * * *